United States Patent [19]
Lesouef

[11] Patent Number: 5,795,481
[45] Date of Patent: Aug. 18, 1998

[54] PROCESS FOR THE TREATMENT OF AQUEOUS EFFLUENTS ON BIOFILTERS OR OTHER DEVICES MAKING USE OF FIXED CULTURES

[75] Inventor: Andre Lesouef, Le Plessis Robinson, France

[73] Assignee: OTV Omnium De Traitements Et De Valorisation S.A., Saint Maurice Cedex, France

[21] Appl. No.: 593,715

[22] Filed: Jan. 29, 1996

[30] Foreign Application Priority Data

Feb. 2, 1995 [FR] France ................................ 95 01412

[51] Int. Cl.⁶ ........................................................ C02F 3/04
[52] U.S. Cl. ................... 210/615; 210/616; 210/617; 210/620; 210/626; 210/631; 210/150; 210/151; 210/103; 210/143; 210/203; 210/209; 210/340; 210/341; 210/909
[58] Field of Search .................... 210/614, 615, 210/616, 617, 620, 626, 631, 150, 151, 103, 143, 198.1, 203, 209, 903, 340, 341

[56] References Cited

U.S. PATENT DOCUMENTS

| | | |
|---|---|---|
| 1,456,914 | 5/1923 | Coombs. |
| 3,976,568 | 8/1976 | Torpey. |
| 4,303,527 | 12/1981 | Reimann et al. ............ 210/614 |
| 4,308,150 | 12/1981 | Miyaoka et al. ............ 210/614 |
| 4,437,992 | 3/1984 | Saito et al. ............... 210/614 |
| 4,892,658 | 1/1990 | Martin et al. ............. 210/617 |
| 5,019,268 | 5/1991 | Rogalla. |
| 5,137,644 | 8/1992 | Stone ..................... 210/341 |
| 5,525,230 | 6/1996 | Wrigley et al. ............ 210/617 |
| 5,589,068 | 12/1996 | Nielsen .................. 210/614 |

FOREIGN PATENT DOCUMENTS

| | | |
|---|---|---|
| 0524794 | 1/1993 | European Pat. Off.. |
| 2 632 947 | 9/1979 | France. |

*Primary Examiner*—Neil McCarthy
*Attorney, Agent, or Firm*—Merchant, Gould, Smith, Edell, Welter & Schmidt

[57] ABSTRACT

A process for the treatment of aqueous effluent with a view to its purification, the process including at least one stage consisting of causing the water to pass into the interior of at least one battery of several biological filters with fixed cultures or other devices with fixed cultures operating in parallel, characterized in that it comprises supplying the filters at constant flow and to cause the number of filters supplied and the number of filters not supplied in the battery, to be varied, in accordance with the total flow of aqueous effluent to be treated. Such a process allows the performance of biofilters and other devices with fixed cultures to be improved.

14 Claims, 2 Drawing Sheets

PROCESS FOR THE TREATMENT OF AQUEOUS EFFLUENTS ON BIOFILTERS OR OTHER DEVICES MAKING USE OF FIXED CULTURES

This invention relates to the field of purification of aqueous effluents by a biological route. More particularly, this invention relates to the treatment of waste water, such as water from urban areas, to purify it, but will also find application for other types of treatment such as making water potable and for the treatment of industrial effluents.

More particularly, this invention relates to treatments of aqueous effluents which include at least one biological filtration stage.

Biological treatments of aqueous effluents and notably of water consist of degrading the organic impurities contained in these effluents by the action of a purifying biomass. There exist therefore, processes with a free biomass ("activated sludges") and processes with a fixed biomass making use of biofilters in which the biomass is attached to a support. More precisely, the invention relates to processes which include such biofilters or other fixed culture devices.

The supports used in such biofilters are generally made up of particles which have a mass per unit volume close to that of water, such as notably particles of polystyrene. Furthermore, the filters used for such processes are generally fitted with means to supply air into the filtering material, which allows the filter to operate by aerobiosis, by anaerobiosis or by biosis with restricted oxygen.

Amongst the processes based on the principle of purification with a fixed biomass, one may mention notably that described in the applicant's patent FR 2632947 and known under the name "Biostyr". This process makes use of a reactor for the purification of waste water by the biological route, by sending rising currents of the water to be treated and an ascending flow of oxygen gas into a reactor fitted with a fluidised bed in its lower zone and a fixed bed in its upper zone, the bed particles consisting of expanded materials with a density less than that of water, those in the fixed bed being both smaller and lighter than those in the fluidized bed.

The techniques of biofiltration allow the removal or, at the very least, the reduction of both carbonaceous and nitrogenous pollution.

To remove carbonaceous pollution, such filters are seeded with heterotrophic bacteria which, in the presence of air, degrade the carbonaceous compounds.

The removal of nitrogenous pollution, which is present in the form of ammonium compounds, is usually achieved by a biological route by causing the water to be subjected to a nitrification stage, in the course of which the ammoniacal nitrogen is converted by a biomass into nitrates, and a denitrification stage, in the course of which the nitrates are reduced by a biomass to nitrites and then to gaseous nitrogen. The nitrification stage is carried out by autotrophic bacteria consuming oxygen brought into the medium whilst the denitrification stage is carried out by heterotrophic bacteria which consume the oxygen from the nitrates in the absence of molecular oxygen.

This conversion can be carried out either on a single filter, operating it for a time with aeration and for a time without aeration or on separate filters, one functioning with restricted oxygen and the other under aerobic conditions.

In the context of aqueous effluent treatment arrangements such as those used to purify waste water, biofilters are used in great number and, for a given function, that is to say, the removal of carbonaceous pollution, nitrification or denitrification, operate in parallel. Such batteries of filters can thus be used to treat large volumes of water.

In the usual way, all the filters operating in parallel are supplied simultaneously at a variable flow rate, their number being designed in such a way that the greatest quantities of water to be treated may be dealt with. Within the context of aqueous effluent treatment arrangements with such filter batteries built in, the entire flow is divided up in a roughly equal fashion between all the filters, and these operate with a flow which is greater or less depending on the total flow of water coming into the arrangement.

The object of the invention is to provide an aqueous effluent purification process, notably for waste water, using such filter batteries, which allows the purification performance of such batteries of filters to be improved in an appreciable way.

Another object of the invention is to describe such an improved purification process which can be carried out with a smaller number of filters whilst obtaining the same quality of outflow for the same total flow being treated.

In particular, yet another object of the invention is to provide such a process which can be used to improve the nitrification efficiency of such an arrangement for treating used water with a view to its purification.

These objects, and others which will subsequently become apparent, are achieved by the invention which relates to a process for the treatment of an aqueous effluent with a view to its purification, said process including at least one stage comprising causing the water to be passed to the interior of at least one battery of several biological filters or other fixed culture devices, said biofilters operating in parallel. The process according to the invention is characterized in that it comprises supplying said biological filters with fixed cultures or other fixed culture devices essentially at constant flow, corresponding to the maximum capacity of a filter compatible with the quality sought at the outflow and to vary the number of filters supplied and the number of filters not supplied in said battery according to the total aqueous effluent flow being treated. (the flow of a compound present in the water refers to the product of its concentration and the flow rate being treated).

Thus, contrary to the precepts of the prior art, which has always taught that one should simultaneously supply all the biological filters in a battery of filters operating in parallel, with a variable flow, the invention advocates supplying these filters at a constant flow, the number of filters being thus supplied at constant flow increasing and decreasing with variations in the total flow of liquid effluent to be treated. In a quite surprising and unexpected way, it has been observed that such supplying of the filters at constant flow brings about a large improvement in the filtration performance compared with supplying them at variable flow.

When using such a process, at least certain filters in the battery are not being supplied with water and hence are not operating. Indeed, also in a surprising way, it has been verified that, the periods of time during which such biological filters are not supplied, even when relatively long, of the order of several days, do absolutely no harm to the effectiveness of the biomass when these filters are once again supplied with aqueous effluent. Such a discovery runs counter to the knowledge of those skilled in the art for whom a break in the supply of nutrients to the biomass ought logically to bring about the degradation of that biomass.

According to the invention, at a certain flow rate, a certain number of filters are supplied, in parallel, at a more or less constant flow. When the flow of effluent to be treated increases, another filter is supplied, in parallel, always at a constant flow. If the overall flow continues to increase, yet another filter is supplied, and so on. In contrast, when the overall flow decreases, the number of filters supplied at constant flow also decreases. Thus, each filter, exists mainly in two states:

- a state in which it is supplied with effluent at a flow which is essentially constant and,
- a state in which it is not supplied with effluent to treat, the filtering material of the filter remaining, of course, submerged in the effluent during these period with no supply.

Nonetheless, it is understood that the last filter supplied will, of course, experience a variable flow.

Contrary to what has been taught according to the state of the technology, the filters are not systematically supplied simultaneously but successively and cumulatively.

According to a preferred variant of the invention, said biological filters are fitted with means of supplying an oxidizing gas, such as air. Nevertheless, in certain modes of application, it could be envisaged that the filters would not be fitted with such means of aeration. This may notably be the case when the biological filters are to be used to denitrify the aqueous effluent (as detailed above, the biomass used to do this is traditionally made up of heterotrophic bacteria which transform the nitrates into nitrites, in the absence of molecular oxygen).

Also preferably, said biological filters are used as nitrification filters. It has, in fact, been observed and will emerge particularly clearly in examples of applying the invention which will be given below, that the use of such a process with biological nitrification filters on an aqueous effluent, brings about improvements in the reduction of ammoniacal pollution levels of up to 75%.

Also advantageously, the process also includes a stage which comprises causing the order of supplying the filters to be varied. Such a stage allows one to vary which filters are supplied first so that one avoids the situation where it is always the same biological filters that operate the most so that the others operate less.

Although one may envisage varying the order of supplying the filters in a more or less empirical fashion, in a particularly interesting way, the process according to the invention includes, equally preferably, a stage comprising measuring for each biological filter, the cumulative length of time over which it is supplied and/or the cumulative flow of aqueous effluent which passes through it and the cumulative period of time it is not supplied and a stage comprising causing the order of supplying the filters to be varied in accordance with the periods of time determined. Hence, overall, each filter will experience, over a long period, approximately the same flow and/or the same usage time.

Also preferably, the constant flow which supplies each filter will be chosen in such a way that it corresponds to the maximum purification capacity of said filters.

The invention also relates to an arrangement for making use of such a process, said arrangement including at least one battery of several biological filters, using fixed cultures, operating in parallel, and characterized in that it includes the means for successively supplying said filters at constant flow. Such means will allow the supply, in parallel, at medium flow, of a number of filters X, at constant flow, then, when the flow increases, a number X+1 then X+2 etc. of filters always at constant flow, and when the flow decreases, a number X−1 then X−2 etc. of filters which are also always at constant flow. The number X should of course be determined in accordance with the average flow and the total number of filters should be chosen in such a way that the greatest flow, prior to treatment, can be dealt with.

Advantageously, the invention also includes means of allowing the order of supplying said biological filters to be varied in such a way that, as explained above, the cumulative operating times and/or the cumulative flow supplied to the different filters are balanced out.

Equally advantageously, the arrangement includes means of measuring the periods of time of supply and of the flow passing through and or periods of non-supply of aqueous effluent to each of said biological filters said measurement means being connected to the means that allow the order of supplying said biological filters to be varied.

Preferably, said biological filters include means for supplying an oxidizing gas such as air.

Equally preferably, said biological filters are nitrification filters. As already stated above, these filters are fitted with the means of supplying oxygen and are seeded with autotrophic bacteria transforming ammonium into nitrate.

The invention, as well as the different advantages which it provides, will be more easily understood thanks to the description which follows of a non-limiting example of its application making reference to the drawings in which

BRIEF DESCRIPTION OF THE DRAWINGS

Referring to FIG. 1, this shows an arrangement forming the nitrification stage of an arrangement for the purification of used water incorporating a battery of ten identical filters 1a to 1j, installed in parallel.

Figure 1:
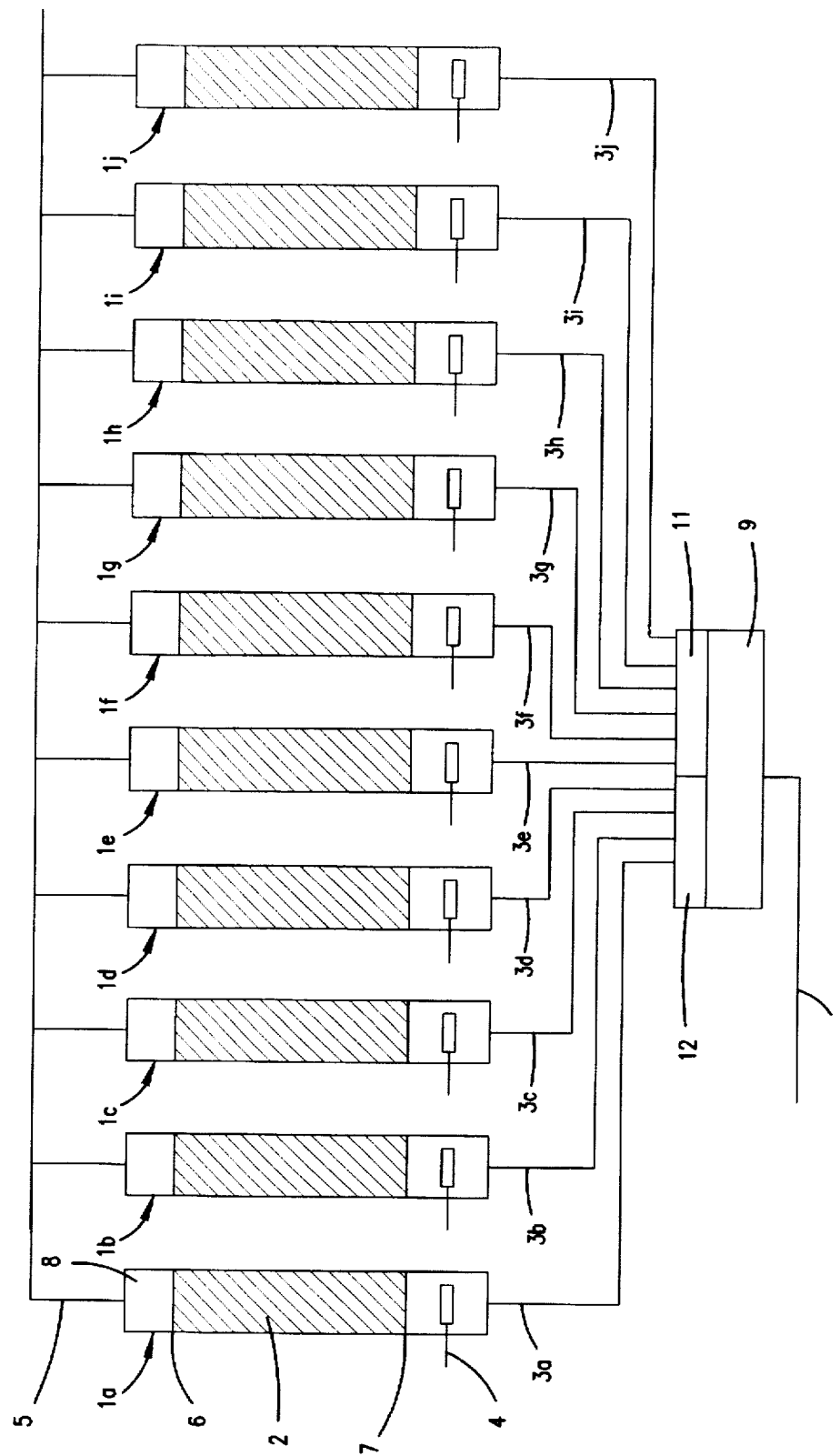
FIG. 1 represents a schematic view of the nitrification stage of an arrangement for treating waste water, making use of the process according to the invention.

These filters are a type known to people skilled in the art under the name "BYOSTYR" and are designed by the applicant. Each includes a filtering material 2 made up of particles of polystyrene held within the filter by perforated plates 6,7. This filtering material has been previously seeded with nitrifying autotrophic bacteria which have been developing on the particles referred to and hang on to them. These filters also provide, in their lower part, means of bringing in the water to be nitrified, comprising channels 3a to 3j, and in their upper part, the means of evacuating the nitrified water comprising channels 5. The flow of water within such filters is hence an ascending flow. They are also, in their lower part, provided with the means of supplying air 4 flowing in the same direction as the water. Finally, one should note that each of these filters, in its upper part, is provided with a reserve of washing water 8 which, by the use of a flushing device (not shown) allows this washing water to rapidly flow in counter current and back wash the filtering material.

These ten filters are suitable to be operated either under the variable regime conforming to the state of the technology or at constant flow according to the invention, thanks to means 9 provided for this purpose. In the two cases, the water to be nitrified arrives via a common channel 10.

The means 9 are furthermore coupled to means 11 which allow the measurement of the cumulative times of supply for each filter and the cumulative flow passing through and the cumulative periods of non-supply and the means 12 to vary the supply order of the filters at constant flow in accordance with the measurements determined by the means 11.

During a first period of 70 days, the arrangement was tested using the variable regime (according to the teaching of the state of the technology), without making use of the means 9 allowing supply of the filters at constant flow. According to this operating process, the pilot filter was supplied in accordance with the variations in the overall flow rate. During this first period the range of burdens applied were the following:

| speed of supply of the filters with water (m/h) | 3 to 8 |
|---|---|
| NTK burden (kg/m³.day) | 0.3 to 1.1 |
| N-NH₄ burden (kg/m³.day) | 0.3 to 0.9 |

The speed of air supplied into the filters remained approximately constant and of the order of 18 Nm/h.

Measurements were made of the average values, over 24 hours of the ammoniacal nitrogen content on entry and on exit of the treated water from the arrangement. These measurements express the reduction in ammoniacal nitrogen content. The measurements were carried out regularly every two hours.

During a second period of 63 days, the arrangement was then tested whilst putting the process according to the invention into action, that is to say, using the means 9 which allow an optimum constant flow to be supplied to the filter when the filter was not supplied.

Mean values over 24 hours and over 2 hours were both measured.

Figure 2:
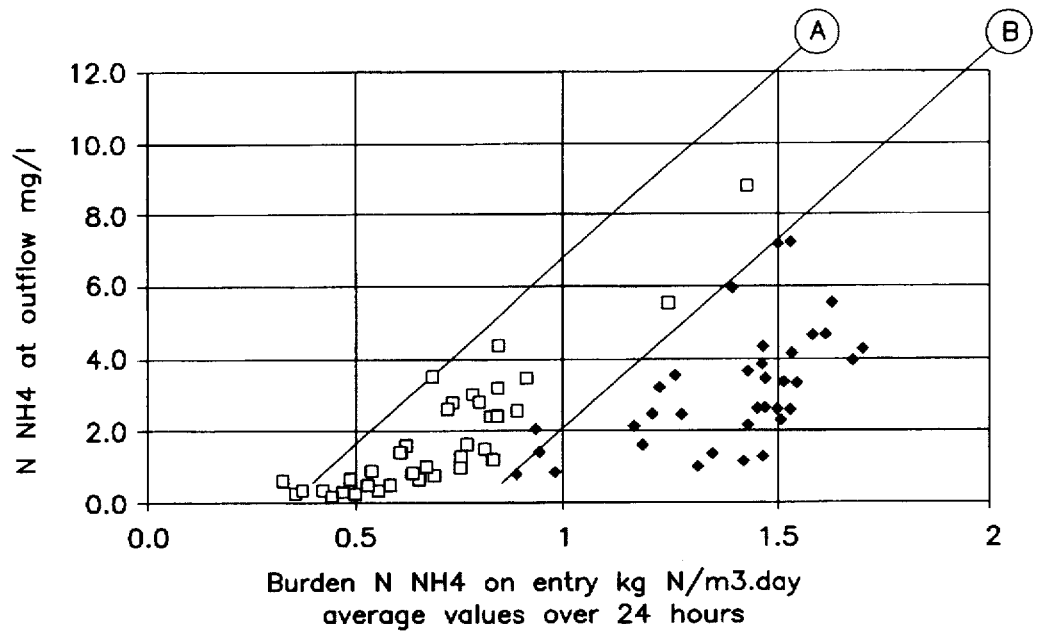
FIG. 2 shows the ammoniacal nitrogen content of the treated effluent at the outflow of a nitrification stage such as that shown in FIG. 1 in relation the ammoniacal nitrogen levels at the input, on the one hand when the arrangement is supplied under a variable regime and on the other when it is supplied at constant flow, each measurement corresponding to a 24 hour mean.

FIG. 2 shows the mean values, determined over 24 hours, for the ammoniacal nitrogen content at the outflow of the arrangement in relation to the burden of this compound on entry, on the one hand, when the arrangement was operating under the variable regime (white squares) and on the other hand, when the arrangement was operating at constant flow (black squares). The line (A) passes through the points representing the least reductions obtained for a given initial burden when the arrangement was operating under the variable regime and the line (B) passes through points representing the least reductions obtained for a given burden when the arrangement was operating with the process according to the invention.

Lines A and B enable one to see the improvement in treatment performance made possible by such a process. Thus, for a burden of ammoniacal nitrogen on entry of 1.5 kg N/m³, a residual level in the outflow of 12 mg/l is obtained with the variable regime, whilst at constant flow, there is a residual level of only 7 mg/l, an improvement in the filtration performance of the filter of 45%. For a burden of 0.8 kg N/m³, a residual level in the output of 5 mg/l is obtained with the variable regime, whilst at constant flow, there is a residual level of 1 mg/l according to line A, an improvement of 80%.

Figure 3:
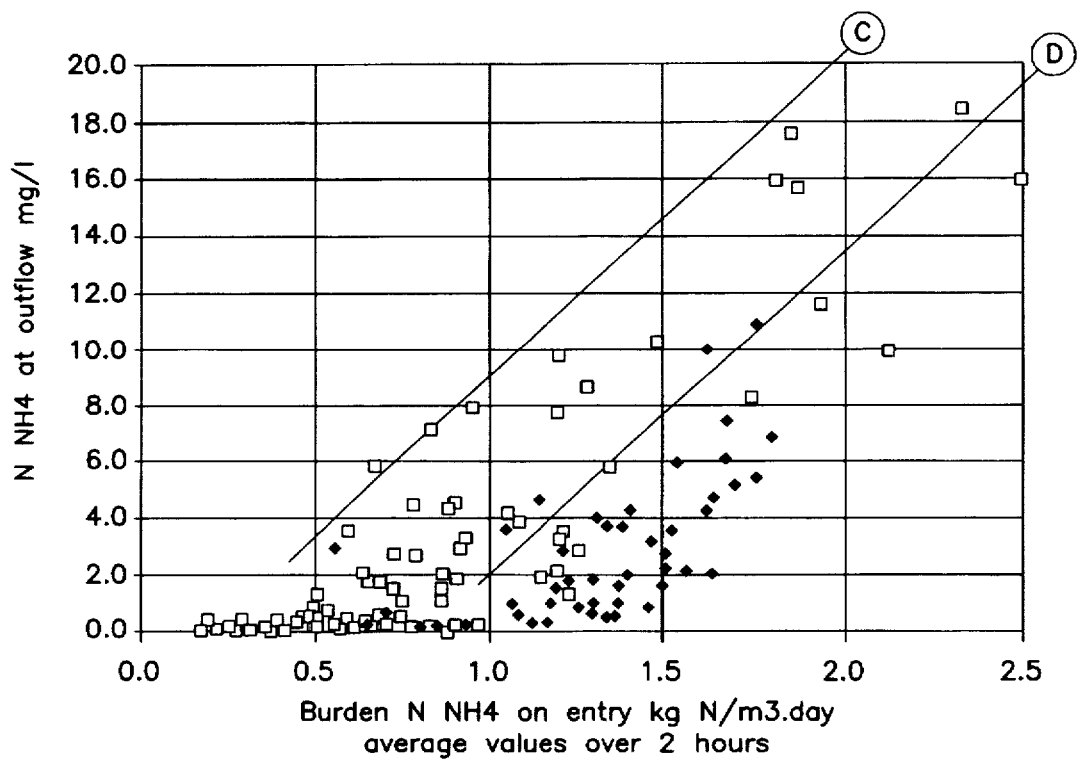
FIG. 3 shows the same type of results, each measurement corresponding to a 2 hour mean.

FIG. 3 shows the mean values observed over 2 hours for ammoniacal nitrogen content at the outflow of the arrangement in relation to the burden of this compound on entry, on the one hand, when the arrangement is operating with the variable regime (white squares) and on the other hand, when the arrangement is operating at constant flow (black squares). Line (C) passes through the points representing the least reductions obtained for a given initial burden when the arrangement was operating under the variable regime and the line (D) passes through points representing the least reductions obtained for a given burden when the arrangement was operating with the process according to the invention.

Lines C and D enable one to see the improvement in treatment performance made possible by such a process. Thus, for a burden of ammoniacal nitrogen on entry of 1.5 kg N/m³, a residual level in the outflow of 15 mg/l is obtained with the variable regime, according to line C, whilst at constant flow, there is a residual level of 8 mg/l, according to line D, an improvement of 47%.

Such a difference in performance between the two regimes may be explained by the hypothesis that since the devices are being supplied with the greatest charge possible, compatible with the oxygenation capacity of the devices, then each device contains the maximum stock of biomass. Furthermore, once constituted, the biomass remains, in a surprising way, well attached to the filter and because the mortality rate is clearly less than the growth rate, remains available, thereby providing an increased treatment capacity.

Within the context of the process according to the invention, certain filters are not brought into operation over relatively long periods of time. It has been proved that these breaks, even relatively long ones, do not significantly impair the activity of the biomass. The following tables show the results relating to reduction in the ammoniacal nitrogen content of one of the filters shown in FIG. 1, the operation of this filter having been stopped several times for several days.

| Day | Applied burden (kg N—NH₄m³.day) | Efficiency (%) | N—NH₄ in outflow (mg/l) |
|---|---|---|---|
| T6 | 1.4 | 79.3 | 5.9 |
| T7 | 1.5 | 76.3 | 7.1 |
| T12 | 1.45 | 85 | 4.4 |
| T19 | 1.45 | 91.9 | 2.4 |
| T28 | 1.52 | 92.2 | 1.4 |
| 3 day break | | | |
| T32 | 1.55 | 89.8 | 3.3 |
| T33 | 1.45 | 87.1 | 3.8 |
| T34 | 1.42 | 92.7 | 2.1 |
| T35 | 1.45 | 91.7 | 2.5 |
| 5 day break | | | |
| T41 | 1.61 | 86.1 | 4.5 |
| T42 | 1.65 | 83.5 | 5.5 |
| T43 | 1.63 | 86.2 | 4.5 |
| T44 | 1.45 | 88.3 | 3.4 |
| T45 | 1.44 | 91.3 | 2.5 |
| T46 | 1.68 | 88.4 | 3.9 |
| T47 | 1.69 | 87.2 | 4.3 |
| 5 day break | | | |
| T53 | 1.41 | 88.4 | 3.5 |
| T54 | 1.53 | 86.4 | 4.1 |
| 7 day break | | | |
| T62 | 0.95 | 93.2 | 1.3 |
| T63 | 0.98 | 96.0 | 0.8 |

These tables prove that, even after very long breaks (up to 7 days), the performance of the filters is not diminished.

The means 11 of the arrangement described above allow the measurement, for each filter, of the periods of operation, the burdens applied and the duration of periods of non-operation. Based on the measurements made by these means 11, the means 12 can be used to vary automatically the order of supplying the filters. Thus, when the flow increases, means 11 can indicate which filter has been out of operation for the longest time or which filter has received the least cumulative burden over a given period of time. Means 12 permit one to send the surplus flow to this filter. Conversely, when the overall flow decreases, the means 11 can indicate which filter has been in operation the longest or has received the greatest cumulative burden over a given period of time, means 12 then allowing one to stop the operation of this filter.

These means 11 and 12 thereby allow the optimization of the biofilters in such a way that each filter experiences, over long periods, the same periods of supply as the other filters and/or the same supply flow.

The method of using the invention which has been described here does not have the objective of reducing the scope of the invention. In particular, the battery of biofilters may contain a different number of filters and of course, these may comprise biofilters other than those described. Equally, the process according to the invention may also be used for processes other than nitrification and notably for denitrification or biological removal of phosphate.

I claim:

1. A process for the treatment and purification of an aqueous effluent, the process comprising the steps of:

passing the aqueous effluent at a total rate into the interior of at least one battery comprising several biological filters, the biological filters having fixed cultures and operating in parallel;

supplying aqueous effluent at a chosen rate to each of one or more biological filters;

supplying one biological filter with a flow of aqueous effluent at a rate that corresponds to the difference between the total rate and the product of the chosen rate times the number of biological filters supplied with the aqueous effluent at the chosen rate; and varying the number of biological filters supplied with the chosen rate of aqueous effluent as the total rate varies.

2. The process of claim 1, wherein the chosen rate is at a maximum capacity of the biological filter compatible with the quality sought at the outflow.

3. The process of claim 1, wherein the biological filters are fitted with means for supplying an oxidizing gas.

4. The process of claim 3, wherein the biological filters are nitrification filters.

5. The process of claim 1, further comprising the steps of:

selecting the one or more biological filters to be supplied with the flow of aqueous effluent at the chosen rate or with the rate that corresponds to the difference; and changing the biological filters selected.

6. The process of claim 5, further comprising the steps of:

measuring the cumulative period of time that each biological filter is supplied with aqueous effluent; and changing the biological filters selected in accordance with the period of time.

7. The process of claim 5, further comprising the steps of:

measuring, for each biological filter, the cumulative flow of aqueous effluent over a given period of time; and changing the biological filters selected in accordance with the cumulative flow.

8. The process of claim 5, further comprising the steps of:

measuring the duration of time each biological filter is not supplied with aqueous effluent; and changing the biological filters selected in accordance with the period of time.

9. The process of claim 1, wherein the chosen rate is at a maximum purification capacity of the biological filters.

10. An arrangement for the implementing the process of claim 1, the arrangement comprising:

at least one battery of several biological filters with fixed cultures, operating in parallel; and means of successively supplying the filters at constant flow to each of the biological filters.

11. The arrangement of claim 10, further comprising means which allow the order of supplying the biological filters to be varied to each of the biological filters.

12. The arrangement of claim 11, further comprising means for measuring the periods of supply to each of the biological filters, means for measuring the flow applied to each of the biological filters, means for measuring the periods of non-supply of aqueous effluent to each of the biological filters, or a combination of one or more of these means, the means of measuring being linked to the means that allow the order of supplying the biological filters to be varied.

13. The arrangement of claim 12 wherein the biological filters include means for supplying an oxidizing gas.

14. The arrangement of claim 13 wherein the biological filters are nitrification filters.

* * * * *

UNITED STATES PATENT AND TRADEMARK OFFICE
CERTIFICATE OF CORRECTION

PATENT NO. : 5,795,481
DATED : August 18, 1998
INVENTOR(S) : Lesouef

It is certified that error appears in the above-identified patent and that said Letters Patent is hereby corrected as shown below:

<u>Column 4,</u>
Line 8, "and or" should read -- and/or --
Line 21, "drawing in which" should read -- drawings. --
Line 36, insert -- DESCRIPTION OF THE INVENTION -- after the word "mean."

<u>Column 7,</u>
Lines 26, 31 and 34, "rate" should read -- flow --
Line 35, "rate and the product of the chosen rate" should read -- flow and the product of the chosen flow --
Line 37, "rate;" should read -- flow; --
Line 39, "rate of aqueous effluent as the total rate" should read -- flow of aqueous effluent as the total flow --
Line 40, "rate" should read -- flow --

<u>Column 8,</u>
Lines 3, 4 and 21, "rate" should read -- flow --
Line 23, delete the word "the" after the word "for"

Signed and Sealed this

Twenty-second Day of April, 2003

JAMES E. ROGAN
*Director of the United States Patent and Trademark Office*